Feb. 26, 1963 I. D. BAUMEL 3,079,464

MULTIPLEX SPEECH COMMUNICATION SYSTEM

Filed Feb. 10, 1960 9 Sheets-Sheet 1

INVENTOR

Irwin D. Baumel

BY James and Franklin

ATTORNEYS

MULTIPLEX SPEECH COMMUNICATION SYSTEM

Filed Feb. 10, 1960 9 Sheets-Sheet 2

INVENTOR
Irwin D. Baumel
BY James and Franklin
ATTORNEYS

INVENTOR
Irwin D. Baumel
BY James and Franklin
ATTORNEYS

INVENTOR
Irwin D. Baumel
BY James and Franklin
ATTORNEYS

MULTIPLEX SPEECH COMMUNICATION SYSTEM

Filed Feb. 10, 1960

INVENTOR
Irwin D. Baumel
BY James and Franklin
ATTORNEYS

INVENTOR.
Irwin D. Baumel
BY James and Franklin
ATTORNEYS

Feb. 26, 1963 I. D. BAUMEL 3,079,464

MULTIPLEX SPEECH COMMUNICATION SYSTEM

Filed Feb. 10, 1960 9 Sheets-Sheet 7

INVENTOR
Irwin D. Baumel
BY James and Franklin
ATTORNEYS

Feb. 26, 1963 I. D. BAUMEL 3,079,464

MULTIPLEX SPEECH COMMUNICATION SYSTEM

Filed Feb. 10, 1960 9 Sheets-Sheet 8

INVENTOR
Irwin D. Baumel
James and Franklin
ATTORNEYS

INVENTOR.
Irwin D. Baumel
BY James and Franklin
ATTORNEYS

United States Patent Office 3,079,464

Patented Feb. 26, 1963

3,079,464

MULTIPLEX SPEECH COMMUNICATION SYSTEM

Irwin D. Baumel, Jericho, N.Y., assignor to Crosby Laboratories, Inc., Syosset, N.Y., a corporation of New York Filed Feb. 10, 1960, Ser. No. 7,836
11 Claims. (Cl. 179—15)

This invention relates to systems for communicating vocal intelligence.

The primary object of the present invention is to generally improve speech communication systems, and particularly multiplex systems for speech.

In speech the voiced sound is made up of the pitch frequency as generated by the vocal cords, and the upper harmonics of the pitch frequency, the major portion of which are below 1500 cycles. In normal speech the pitch frequency is constantly varying, and the upper harmonics vary proportionately.

This invention converts each speech signal to monotonic speech comprising a fixed predetermined fundamental frequency and its harmonics. The frequencies of the monotonic signals are so fixed that each has a starting frequency different from the others, and has higher frequencies also different from the higher frequencies of the others. The spaced frequencies of the different speech signals are interlaced, with each occupying frequency space unoccupied by the others. These monotonic speech signals are used to modulate a carrier by means of any desired modulation technique.

At the receiving terminal the carrier is demodulated and the original frequency relationship is restored. The signal is separately comb-filtered for each channel in order to select a fundamental and its harmonics for each channel, while attenuating frequencies between said harmonics. The resulting separated speech signals are used to drive separate transducers.

Further objects are to provide different methods of interlacing the monotonic signals. In one such method different fundamentals are used, with consequent difference in their harmonics. In another method the same fundamental and harmonics are used for each channel, but the spaced frequencies of a second channel are shifted somewhat as an entirety relative to the first, and the spaced frequencies of a third channel are shifted by a different amount, and so on.

Although the speech signal is monotonic it contains all of the information in the original speech signal, and it is readily intelligible to the listener. This is sufficient in most cases because the transmission of information is the prime objective. However in some cases it is desirable to restore the pitch variations at the receiver. For example, in public utility telephony the listener may want to hear the inflecions of the voice of the speaker. Accordingly, another object of the present invention is to restore or reconstitute the normal speech at the receiver for each channel or speech signal.

A further object is to prevent mutual interference between channels in the upper as well on the lower frequencies.

There is an important advantage in practising the present invention even as applied to a single speech channel namely, a substantial improvement in the signal-to-noise ratio. This provides maximum efficiency in utilizing the transmitter power. However, the use of my invention in a single channel is not claimed herein, it being claimed in a co-pending application Serial No. 852,029, filed Nov. 10, 1959, and entitled "Speech Communication System." The present case is direct to and claims the multiplexing of speech communication.

To accomplish the foregoing general objects, and other more specific objects which will hereinafter appear, my invention resides in the method steps and apparatus elements and their relation one to another as are hereinafter more particularly described in the following specification. The specification is accompanied by drawings in which.

Figure 3:
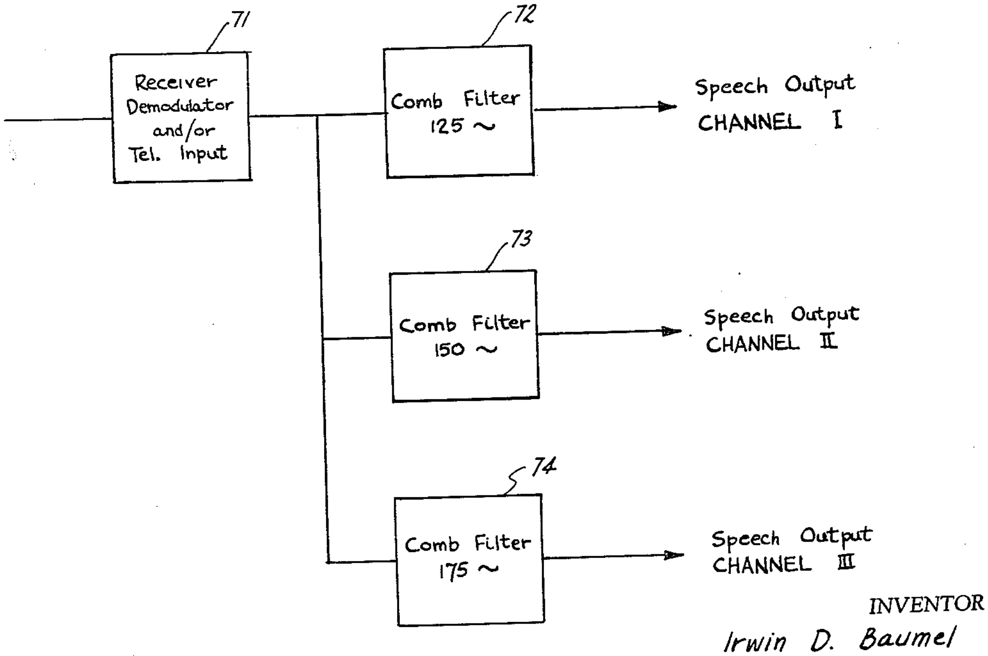
FIG. 3 is a simplified block diagram of a receiver for use with the transmitter of FIG. 1.
Figure 5:
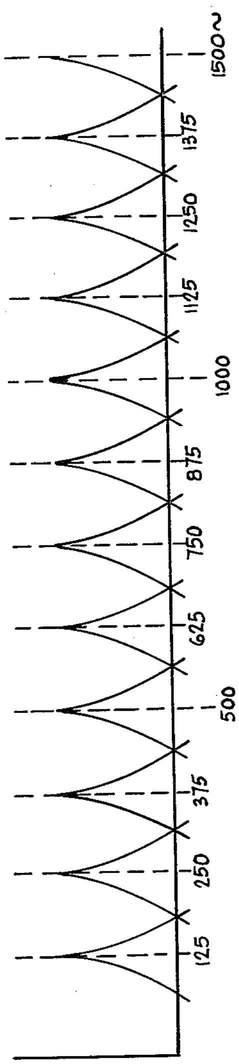
Figures 4, 12:
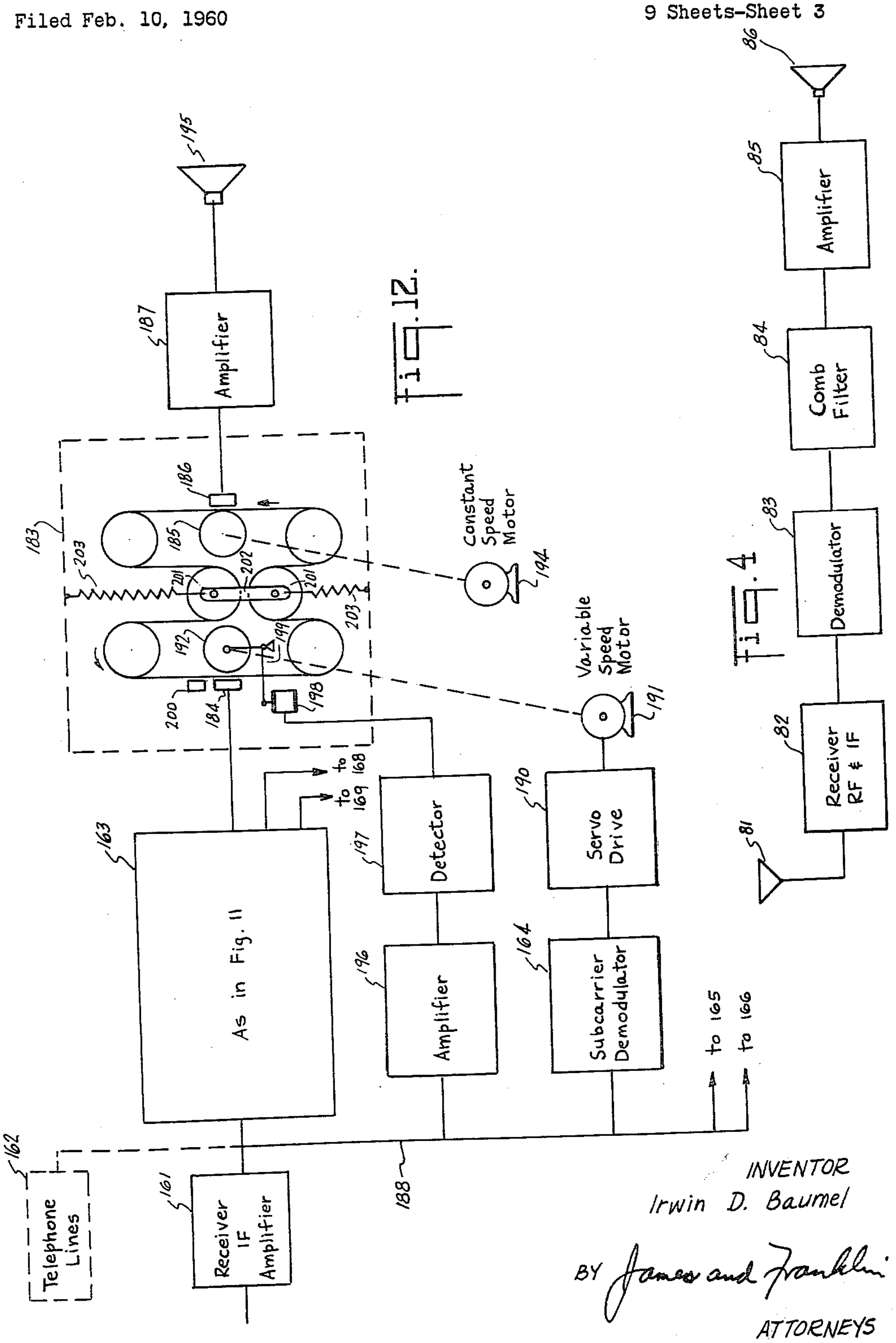
FIG. 4 is a somewhat more complete block diagram of a single channel receiver which corresponds to the first channel in FIG. 3, and also corresponds to a receiver diagram in my co-pending patent application aforesaid.
Figure 6:
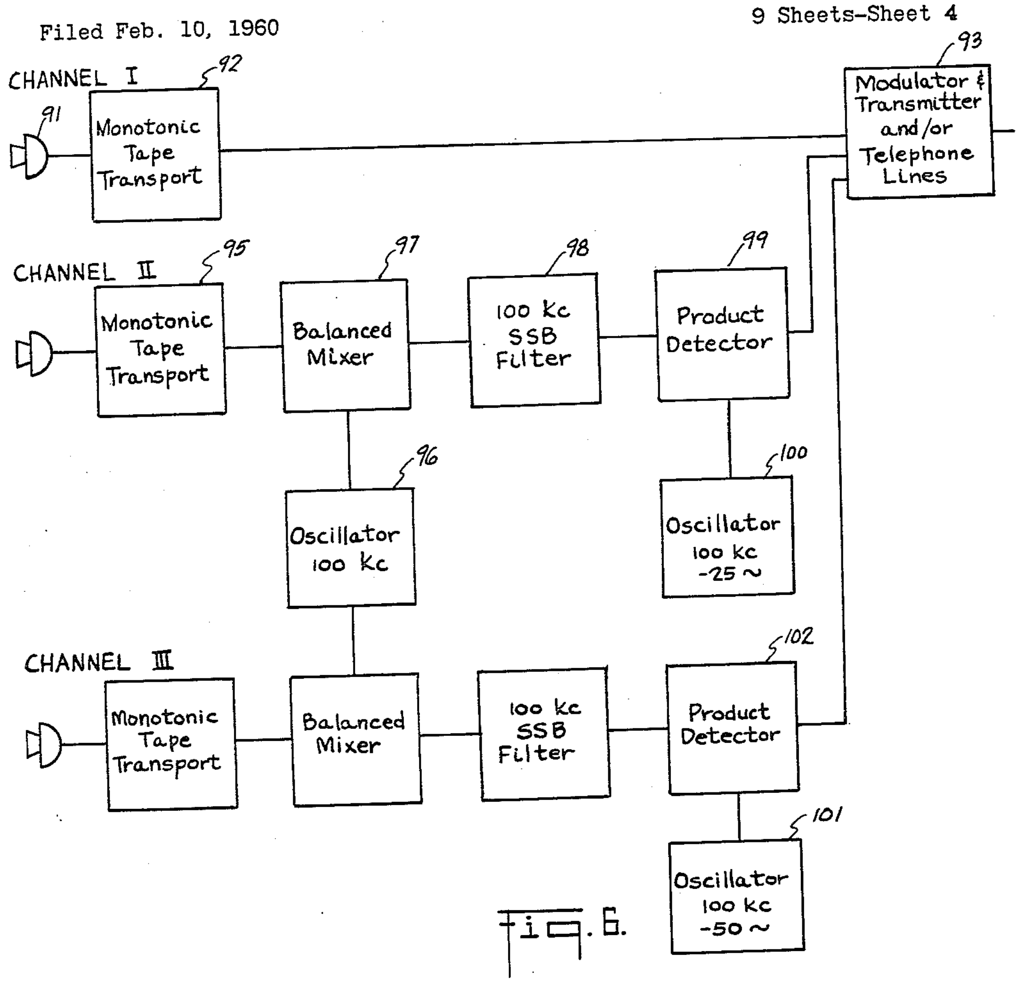
Figure 7:
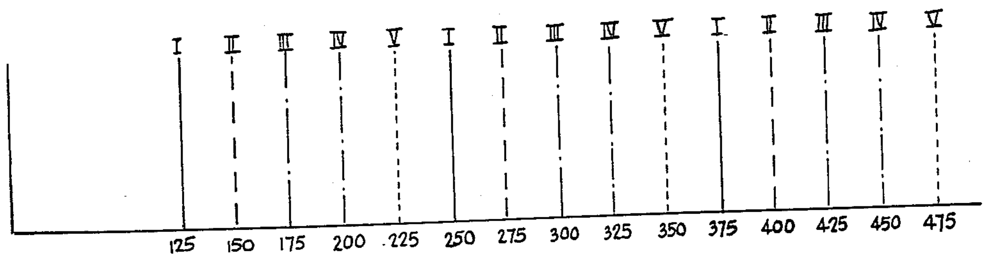
Figures 8, 9:
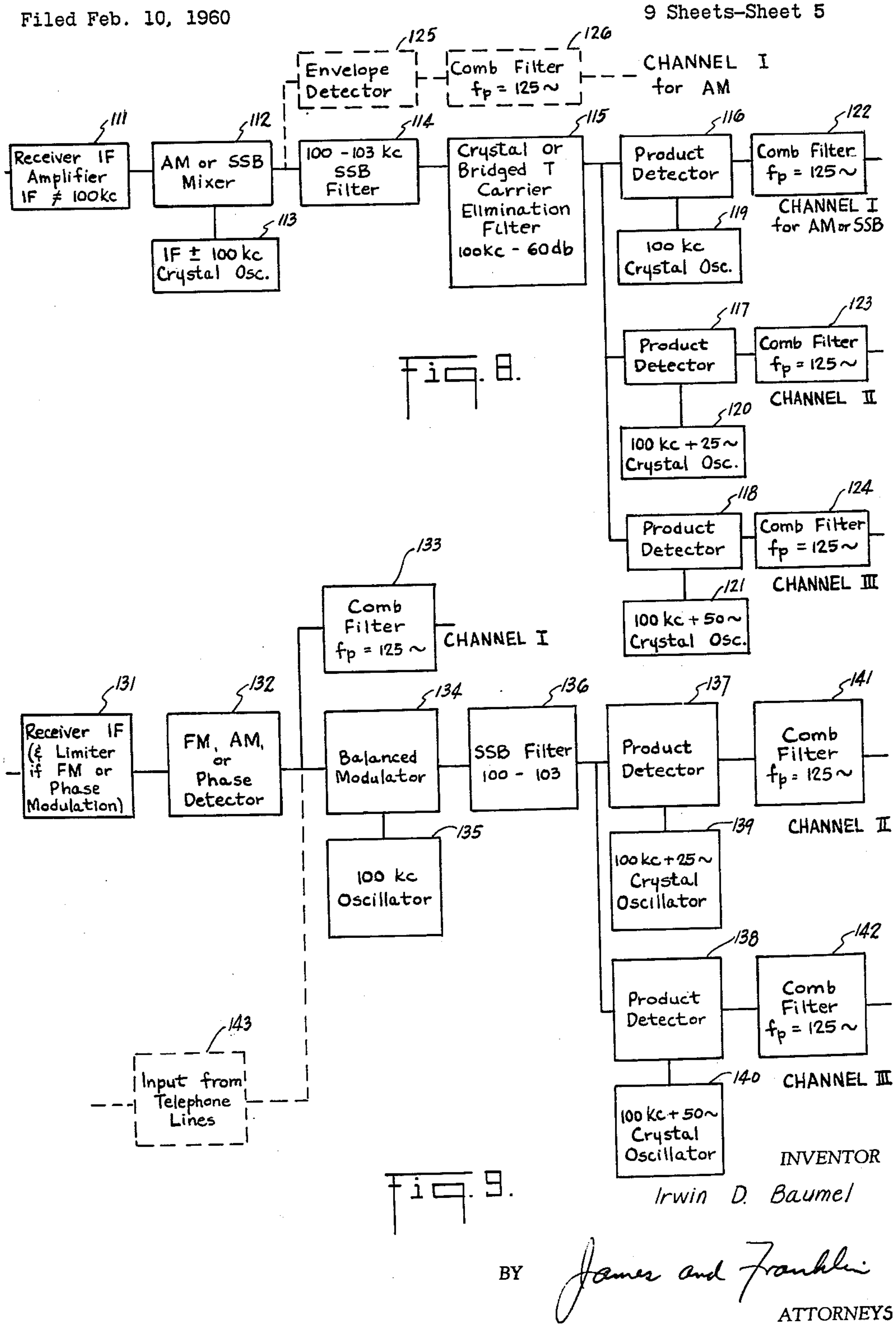
Figure 10:
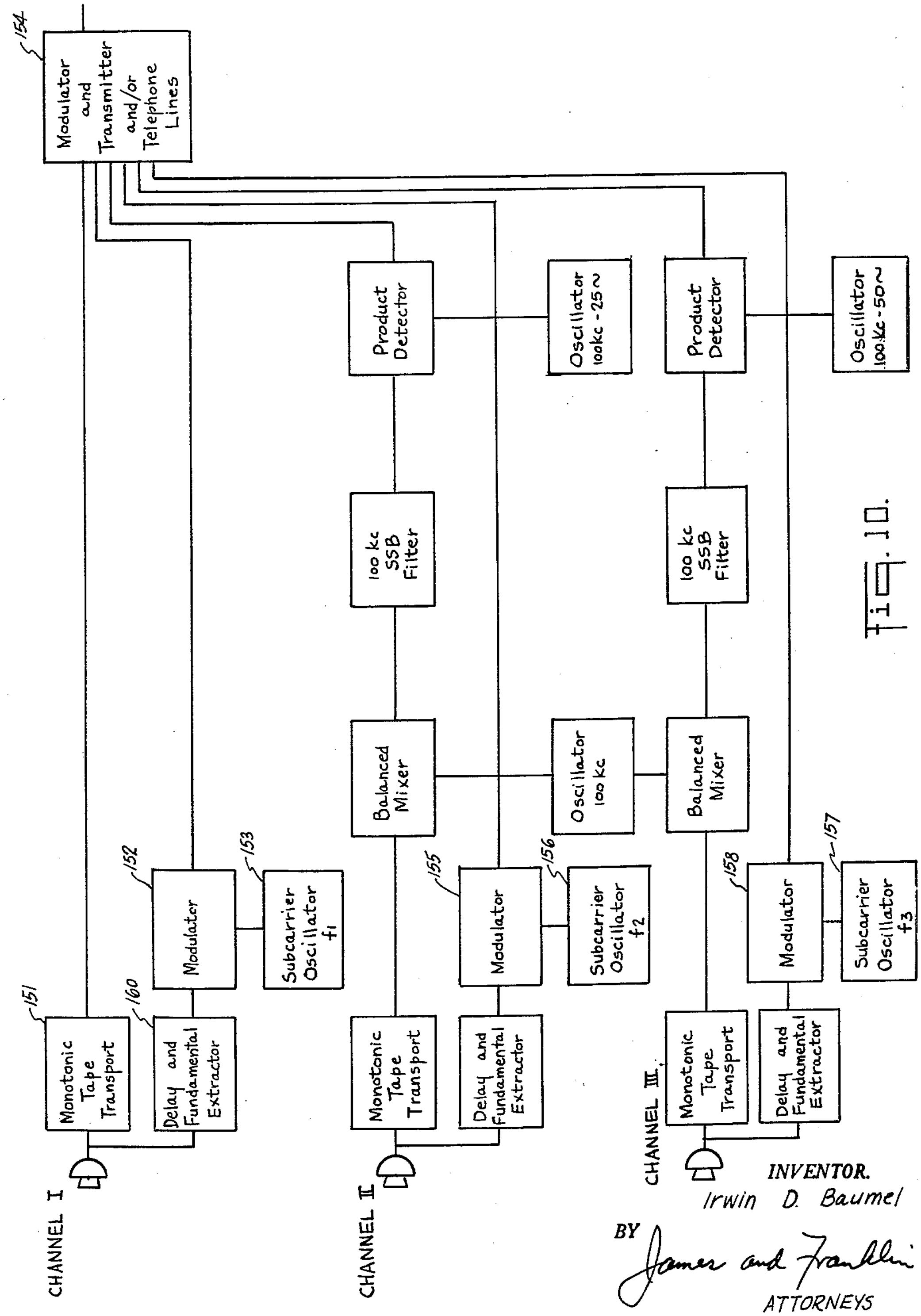
Figure 11:
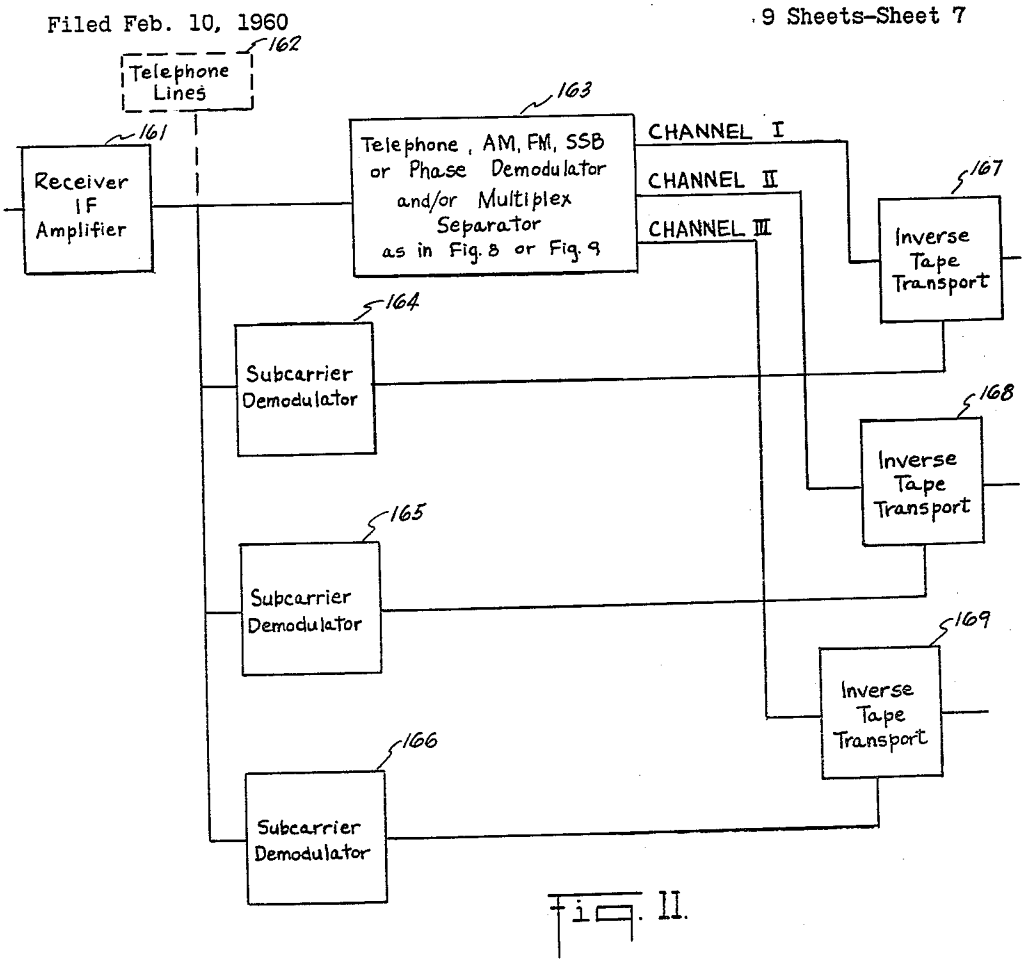
Figure 14:
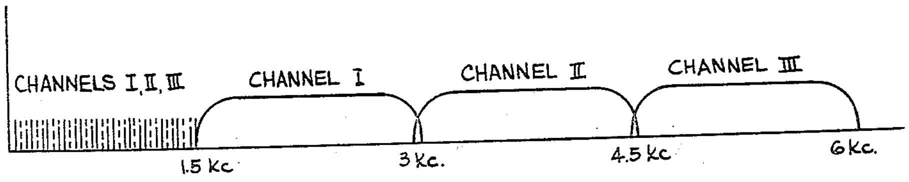
Figure 13:
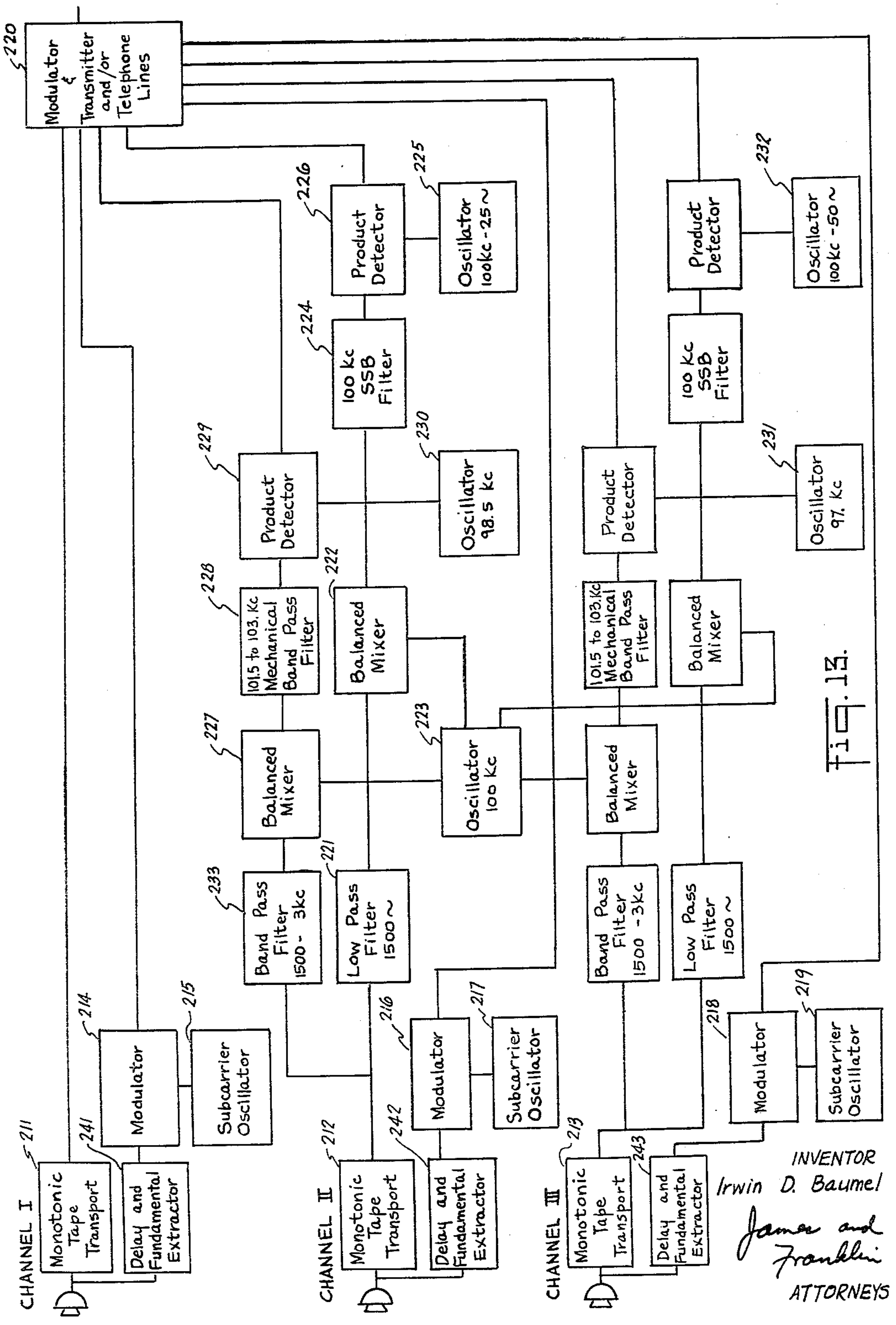
Figure 15:
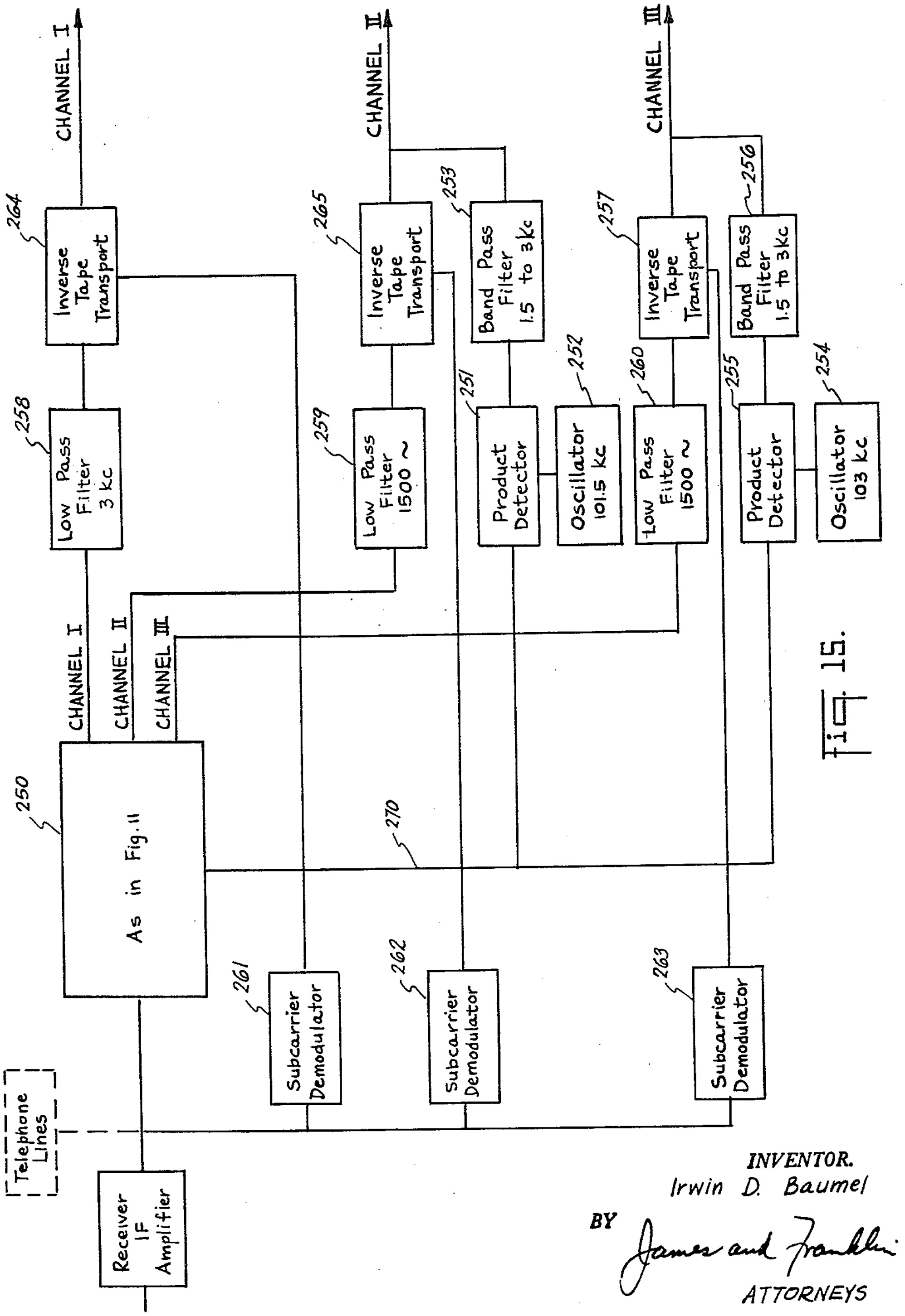

FIG. 5 explains a comb filter used in the receivers shown in FIGS. 3 and 4;

FIG. 6 is a block diagram for a modified transmitter embodying features of my invention;

FIG. 7 is explanatory of the interlacing of the multiplexed monotonic signals;

FIG. 8 is a block diagram showing a receiver for use with the transmitter shown in FIG. 6;

FIG. 9 is a block diagram showing another receiver for use with the transmitter shown in FIG. 6;

FIG. 10 is a block diagram for a transmitter intended for use in a system in which reconstituted or normal speech is wanted at the receiver;

FIG. 11 is a block diagram showing a receiver for use with the transmitter of FIG. 10;

FIG. 12 is explanatory of an inverse tape transport used in FIG. 11 for restoring normal speech, with associated apparatus for one of the channels;

FIG. 13 is a block diagram for a modified transmitter for use in a system which provides reconstituted speech at the receiver, and which separates and differently handles the upper frequencies;

FIG. 14 is explanatory of the relationship of the band-pass channels above 1500 kc. in the system of FIG. 13; and FIG. 15 shows a receiver for use with the transmitter of FIG. 13.

Figure 1:
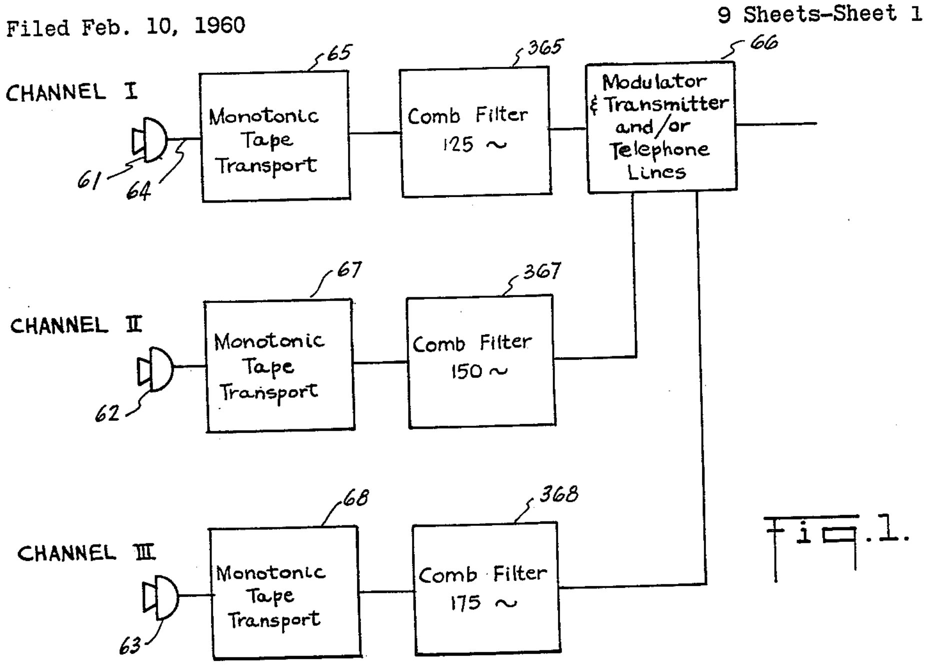
FIG. 1 is a simplified block diagram of a transmitter embodying features of the present invention.

FIGURE 1 shows the application of three speech channels to a transmitter or to telephone lines. The three transducers 61, 62, 63, convert voice sound to electrical energy. In channel I, the signal is applied via line 64 to the monotonic tape transport 65. This monotonic tape transport consists of a tape transport and the circuitry necessary to convert normal speech with a variable pitch, to monotonic speech where the pitch is constant, in this case 125 cycles. The monotonic speech is applied to the modulator and transmitter or telephone lines 66. For the present the boxes 365, 367, and 368 are to be disregarded, and their use is optional, as is explained later.

Channel II consists of identically the same arrangement for the monotonic tape transport 67, and creates monotonic speech having a pitch frequency of 150 cycles. Channel III is identical to channels I and II except that the monotonic speech from tape transport 68 has a pitch frequency of 175 cycles. The number of channels that can be used is not limited to three, but rather is limited by minimum frequency spacing between channels, and by the lowest pitch frequency usable.

Figure 2:
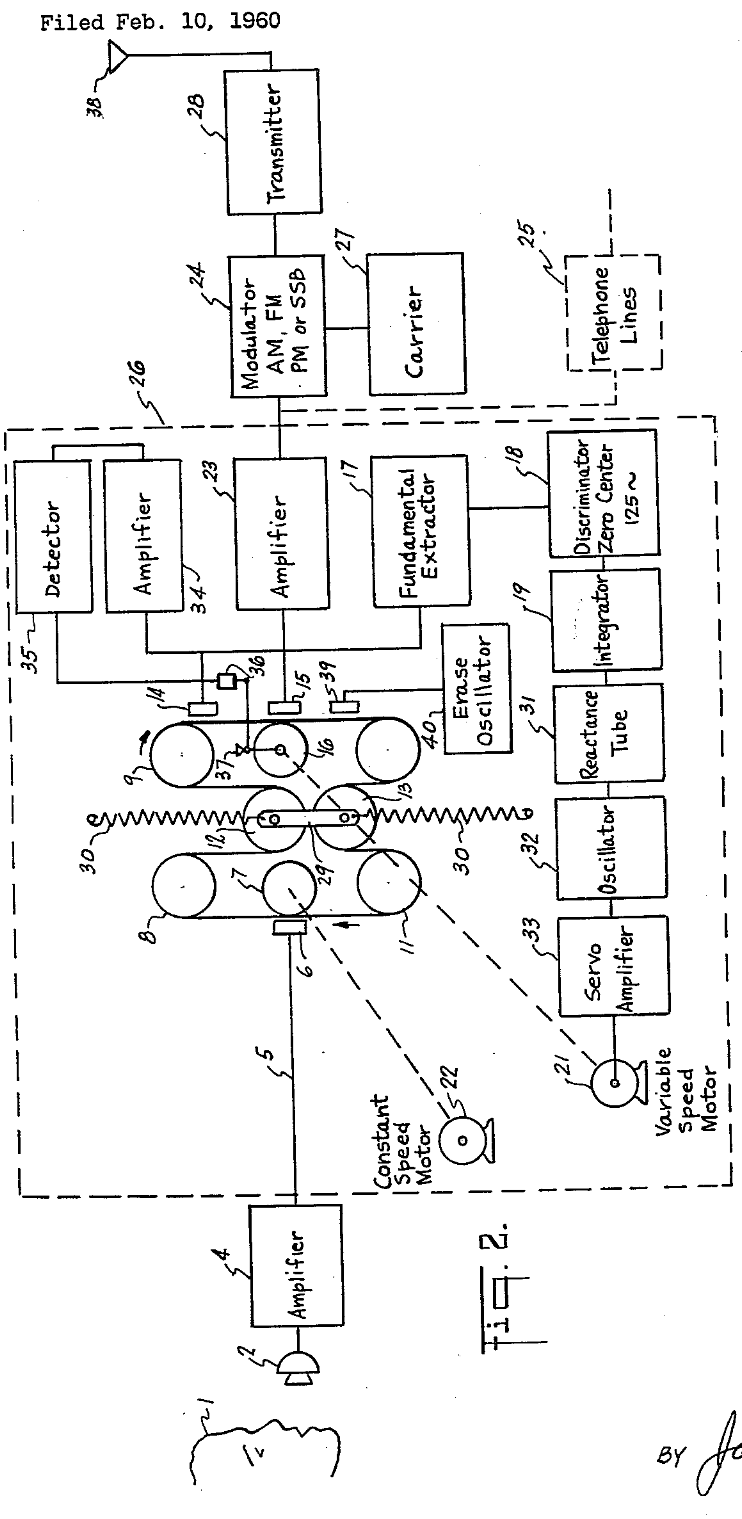
FIG. 2 is a more detailed diagram explanatory of the monotonic tape transports used in FIG. 1, and shows the invention applied to a single channel, as in a transmitter diagram of my co-pending patent application aforesaid.

Referring now to FIG. 2, the apparatus for speech transmission comprises a means represented within box 26 for changing speech energy to monotonic speech made up of a fixed predetermined fundamental frequency and its harmonics. This monotonic speech could be set over a telep'one line system, indicated at 25, or more usually on a high frequency carrier, and in the present case there is a carrier source 27, and a means 24 to modulate the carrier, followed by a transmitter 28 for transmitting the modulated carrier.

Considering the apparatus in greater detail, the voice signal from source 1 is picked up by a microphone or transducer 2 which converts audible sound to electrical energy. This is applied to an amplifier 4 where it is properly amplified and compensated for application to magnetic tape. It is then conveyed by line 5 to a tape recorder head 6. The tape is caused to move past the head 6 by means of a constant speed capstan 7. The rollers 8, 9, 10 and 11 are idlers located on fixed centers in the tape transport. The rollers 12 and 13 are also idlers but are movable and linked together by link 29, for simultaneous movement. They are spring loaded by opposed springs 30, and are capable of moving in either direction. Both 14 and 15 are tape playback heads. The tape engages a capstan 16 which causes the tape to pass the pickup heads 14 and 15 whenever voiced speech is picked up by head 14. The tape is disengaged from capstan 16 during intervals when no speech is present at the output of the playback head 14. This permits the two coupled, spring loaded idlers 12 and 13 to return to their neutral or mid position.

The pickup head 14 monitors the recorded speech that has been put on the tape by the recording head 6 and applies it to two different circuits. One detects the presence of speech on the tape, and when speech is present, it activates the clutch so that the tape is pressed against the playback capstan. To do this, the output from the pickup head 14 is amplified at 34, and then applied to detector circuit 35 having a fast attack time constant, and a decay time constant that will not permit the clutch to disengage until the speech on the tape passing head 14 is permitted to pass the pickup head 15. The D.C. output from the detector 35 is of sufficient amplitude to activate a relay 36 of the solenoid variety in order to engage the clutch. A thyratron may be used to activate the relay should further sensitivity be desired in this circuit.

The output of pickup head 14 is also applied to a device 17 called a fundamental extractor. Several such devices are available, one of which is described by Carl B. H. Feldman and Andrew C. Norwine in their Patent No. 2,859,405, granted November 4, 1958. The output is the pitch or fundamental frequency of the recorded voice signal on the tape as it passes pickup head 14. The extracted pitch frequency is applied to a zero center discriminator or FM detector 18. The zero center frequency in this case is 125 cycles, but this is for illustration only.

The output of the discriminator 18 is a voltage that is proportional to the frequency difference between the voice pitch as it is picked up by the tape head 14, and 125 cycles (or whatever center frequency is chosen for the discriminator). This output is applied to an integrator 19 (e.g. an RC circuit) which will determine the maximum rate of change of the feedback signal being applied to the variable speed motor 21. This is done much as is commonly done in servo loop practice, in order to prevent hunting.

The output of the integrator 19 goes to a reactance tube 31 followed by an oscillator 32 and a servo amplifier 33 which applies appropriate control information to a motor 21. The servo drive consists of the reactance tube 31, and the oscillator 32, the unbiased frequency of which corresponds to the frequency activating the constant speed drive motor 22. The oscillator output is amplified by a power amplifier 33 and then applied to the motor 21. This may be a low inertia synchronous motor, or it could be a variable speed D.C. motor. When an error signal is detected by pickup head 14, the error signal eventually appears as a change in oscillator frequency at 32, which in turn changes the speed of motor 21 in a direction to correct the error. An alternate method uses a D.C. capstan drive motor and provides D.C. amplification of an error potential, which then is used to vary the speed in accordance with the error as detected by the discriminator.

The tape moves at constant speed past head 6, but at variable speed past head 15, and the variations are such as to reduce a higher fundamental (and its harmonics) and to increase a lower fundamental (and its harmonics), in order to produce a constant fundamental (and its harmonics), that is, to produce monotonic speech in head 15.

The speed changes involve a change in tape length between head 6 and head 15. This is provided by a movement of linked idlers 12 and 13. However to avoid a cumulative change the capstan 16 is released during silent intervals such as pauses between words. For this purpose a part of the output of pickup head 14 is amplified at 34 and detected at 35, the latter acting as a speech interval detector. As a schematic representation, its output is led to a relay-like magnet 36 controlling capstan 16 thru an angle lever 37. The tape is engaged for speech, and disengaged during pauses or silence.

For simplicity the captan is shown movable. However in practice the capstan is stationary, and a small idler on the opposite side of the tape is moved toward or away from the capstan. The mechanism may be like that used in tape transports for data processing, such as those made by Potter Instrument Co., Inc. of Plainview, N.Y.

Magnetic pickup head 15 (FIG. 2) removes the information contained on the tape, which is monotonic as it passes the head, and applies it to an amplifier 23. The amplifier output can then be made available for either modulation in an AM, FM, PM or SSB transmitter, or any other type of transmitter that is commonly used for the modulation and transmission of voice intelligence. This is here indicated by modulator 24 for a carrier from source 27, and a transmitter 28, leading to an antenna 38. The output of amplifier 23 can also be applied directly to telephone lines 25, as shown in broken lines.

The distance of monitor pickup head 14 from the main pickup head 15 is adjustable, and is made adequate to take care of the mechanical and electrical delays in the motor speed control loop 17, 18, 19, 31, 32, 33, 21. Previous recording is erased ahead of the recording head 6. This is done by an erasing head 39 supplied from an erase oscillator 40.

The technique of FIG. 2 stabilizes the pitch of a voice speech signal. When this is done, any interfering signal such as noise, spuriouses, or undesirable signals located between successive pitch frequency components, may be filtered out without producing information content.

In accordance with the present invention, the unused spectrum is used to transmit additional information. The present specification describes several methods for making use of the unused spectrum in order to multiplex a number of speech signals on a single carrier, or on telephone lines. The first method is that shown in FIG. 1.

In FIG. 1 the monotonic tape transport in each of boxes 65, 67 and 68 corresponds to the dotted rectangle 26 in FIG. 2, but they operate with differening fundamental frequencies, e.g. 125, 150, and 175 cycles. The harmonics differ accordingly. Audio amplifiers like 4 in FIG. 2 may be used following the microphones 61, 62 and 63. The single box 66, FIG. 1, corresponds to the three boxes 24, 27 and 28 in FIG. 2.

FIGURE 3 shows a receiver which may be used to demodulate and separate the multiplexed signals created and transmitted by the transmitter shown in FIGURE 1. The input is provided by the receiver demodulator and/or telephone input lines 71. The multiplexed audio signal is applied to three comb filters. The comb filter 72 for channel I has a fundamental frequency of 125 cycles, and permits the passage of each harmonic of 125 cycles up to 1500 cycles, if no comb filters are used in the transmitter, and up to 3000 cycles if comb filters are used in the transmitter, as explained later. The comb filter 73 for channel II similarly consists of a series of spaced pass bands. It is a filter capable of passing 150 cycles and each harmonic of 150 cycles to 1500 (or 3000) cycles. The comb filter 74 for speech channel III has pass bands for 175 cycles and its harmonics to 1500 (or 3000) cycles.

By way of further explanation, reference now is made to FIG. 4 wherein the signal generated by the transmitter of FIG. 2 is received, demodulated, and properly filtered, before being applied to a transducer. The modulated wireless signal arrives at antenna 81. It is then selectively chosen and amplified by a receiver 82, including RF and IF amplifiers, as is common practice in wireless receivers. The signal then is applied to a demodulator 83 where the complete intelligence is removed from the carrier by standard demodulation techniques appropriate for each of the modulation types (AM, FM, PM or SSB) described for the transmitter.

The demodulator output then is filtered by comb filter 84. The comb filter has a series of cascaded, harmonically-related pass bands as shown in FIG. 5. The fundamental frequency is the same fundamental frequency as was chosen for the transmitter tape transport device, in this case 125 cycles. The comb filter may consist merely of a simple delay line feedback arrangement for all harmonics, or a group of high gain, bridged-T, feedback filters, one for each individual harmonic.

A recent authoritative article on comb filters is entitled "Enhancement of Pulse Train Signals by Comb Filters," by Janis Galeia, published by the Professional Group on Information Theory of the Institute of Radio Engineers, vol. 1P–4, September 1958, in the Transactions on Information Theory.

The comb filter output then is fed to an audio frequency amplifier 85 (FIG. 4) and to a transducer 86 from which the speech information is heard. The intelligence contained at the output of the comb filter is ideally the same as the information contained at the input of the comb filter, except for the noise and spurious interference and the other channel signals between the selected successive harmonics.

Data is currently available to show that speech information below 1500 cycles has a 92% articulation (percentage of words correctly recorded by a listener, compared to what is uttered by a speaker). This means that there is great value and benefit in transmitting frequency components even when only 1500 cycles or less. Signals occuring within the reject bands will be eliminated by whatever degree the comb filter is capable of reject band attenuation.

The comb filters of the receiver may be designed to go up to, say, 3000 instead of 1500 cycles, but some interference between the higher harmonics may then take place. If the frequencies are to go up to 3000, it is feasible and desirable to use comb filters at the transmitter as well as at the receiver, and in FIG. 1 the comb filter 365 passes a fundamental of 125 cycles and its harmonics; the comb filter 367 passes a fundamental of 150 cycles and its harmonics; and the comb filter 368 passes a fundamental of 175 cycles and its harmonics. These filters go up to 3 instead of 1.5 kc. They reduce interference because the upper spectrum then is periodic, the same as the lower spectrum.

However, another way to reduce interference, and at the same time to make use of comb filters which are all identical for the different channels, is described hereinafter in connection with FIG. 6 of the drawing. In this system the spaced frequencies of channel II are shifted somewhat as an entirety, and the same for channel III but with a further shift.

Referring to FIG. 6, voice speech is applied via a transducer 91 to the monotonic tape transport 92. The output of this tape transport consists of speech having a constant pitch frequency of 125 cycles and its harmonics. This is then applied to modulator 93 where it is either modulated and transmitted, or is applied to telephone lines.

In speech channel II, speech is applied via transducer 94 to the monotonic tape transport 95, the output of which again consists of speech having a pitch frequency of 125 cycls. This monotonic speech is then mixed with a 100 kc. crystal controlled oscillator 96 in a balanced mixer 97. The balanced mixer output then consists of the double sideband distribution of an amplitude modulated signal, less the carrier. An electro-mechanical filter 98 having a pass band of from 100 to 103 kc. then eliminates the lower sideband. The upper sideband suppressed-carrier signal is then applied to a product detector 99. Also applied to the product detector is a reinserted carrier from oscillator 100 having a frequency of 100 kc. minus 25 cycles. The product detector output then consists of audio components where the first component in frequency is 150 cycles, and succeeding components are located 125 cycles apart. This signal is then applied to the modulator and transmitter or (telephone lines) 93.

A third speech signal is applied to channel III and is subjected to the same treatment as in channel II using the same oscillator 96, except that the reinsertion oscillator 101 oscillates at a frequency of 100 kc. minus 50 cycles. The output of the product detector 102 in this case then consists of audio components where the first component is at 175 cycles, and each succeeding component is spaced 125 cycles above the preceding component. The output of the product detector 102 is also applied to the modulator and transmitter (or telephone lines) 93.

The monotonic pitch frequency created by the monotonic tape transport may be any frequency chosen to be most desirable in the range of 75 to 300 cycles. When 125 cycles is chosen as in FIG. 6, and a spacing of 25 cycles between successive multiplexed channels is used, then up to five multiplexed channels may be employed, as shown in FIG. 7. The numerals at the top, and also the character of the broken lines, indicate the channels. The numerals at the bottom indicate the frequencies. It will be seen that the monotonic signals are interlaced, and that each occupies frequency space unoccupied by the others. For convenience, this language is used also for the transmitter of FIG. 1, although there, a few of the higher harmonics finally may come into coincidence, but the amount of interference is of minor consequence, if any should occur at all.

On reflection it will be seen that in the system of FIG. 1, and the system of FIG. 6, it may be said that generically each speech signal is changed to a monotonic signal, with the frequencies so fixed that each monotonic signal has a starting frequency different from the others, and has higher frequencies also different from the others. In FIG. 1 this is done by using somewhat different fundamental frequencies for the different channels, with a consequent difference in the harmonics. In FIG. 6 the same fundamental is used for all channels, but the spaced frequencies of the second channel are shifted somewhat as an entirety, and the spaced frequencies of a third channel are similarly shifted as an entirety, but by a different amount of frequency shift, and so on for any additional channels. Thus in FIG. 7 five channels are shown, with channel II shifted 25 cycles; channel III shifted 50 cycles; channel IV shifted 75 cycles; and channel V shifted 100 cycles.

FIG. 8 shows a block diagram of a receiver which may be used in the detection and separation of the multiplexed signals generated by the transmitter in FIG. 6 when the signal is amplitude modulated or single sideband modulated. An amplitude modulated or single sideband modulated signal with interlaced multiplex modulation is amplified in a receiver and IF amplifier 111 having an intermediate frequency other than 100 kc. The signal is then mixed in a mixer 112 with an oscillator signal from an oscillator 113 having a frequency equal to the intermediate frequency plus or minus 100 kc. The mixer output is then applied to a filter 114 having a passband of 100 kc. to 103 kc. If the signal is amplitude modulated, the output of filter 114 will be the upper sideband with some carrier. If the signal is single sideband suppressed carrier, the output of filter 114 will be the upper sideband frequency components only.

It is necessary to eliminate the carrier in the AM signal, or to reduce the carrier to a harmless level for the single sideband signal. This is done in a crystal or bridged T carrier elimination filter 115. The upper-sideband completely-suppressed-carrier, output of filter 115 is then subjected to carrier reinsertion in each of the three product detectors 116, 117 and 118. The reinsertion oscillator 119 for channel I is at exactly 100 kc. The reinsertion oscillator 120 for channel II, is at 100 kc. plus 25 cycles. The reinsertion oscillator 121 for channel III is at 100 kc. plus 50 cycles. The outputs of the product detectors 116, 117 and 118 are separately applied to identical comb filters 122, 123 and 124 having narrow pass bands of several cycles in width, and all being located at 125 cycles and its harmonics.

If the signal is an amplitude modulated signal, channel I may be separated alternatively by the use of an envelope detector shown in broken line box 125 feeding a comb filter 126 of the type just described, also shown in broken lines. The boxes 116, 119 and 122 then are eliminated.

FIG. 9 shows a block diagram of a somewhat different receiver that may be used to detect and separate the interlaced multiplexed signal generated by the transmitter of FIG. 6, should the modulation be either FM, AM, PM, or an input from telephone lines, the latter being shown in dotted lines. A modulated signal is received at 131 and detected at 132. It is then applied to a comb filter 133 with the same characteristics as described for FIGS. 6 and 8. The output is the channel I speech signal. For channels II and III, the detected interlaced multiplexed audio is applied to a balanced modulator 134, and there mixed with a 100 kc. oscillator signal generated by oscillator 135. The output of the modulator 134 then consist of a double sideband AM signal with the carrier suppressed. The filter 136 passing say 100 to 103 kc. eliminates the lower sideband. The output of this filter is applied to the product detector 137 for channel II, and to the product detector 138 for channel III, where oscillator signals are reinserted for detection. The reinsertion oscillator 139 for channel II is at 100 kc. plus 25 cycles, and the reinsertion oscillator 140 for channel III is at 100 kc. plus 50 cycles. As in FIG. 8, the product detector outputs are comb filtered in comb filters 141 and 142 in each of which the pitch frequency is 125 cycles. The filters 133, 141, and 142 are all alike.

When receiving over telephone lines the boxes 131 and 132 are eliminated, and the connection is made at box 143, which represents switchboard or other appropriate telephone equipment.

There may be occasions in which it is desired to restore the monotonic speech to substantially the original speech at the receiver. Thus in civilian or public utility telephony it may be thought desirable for the listener to hear the inflections of the voice of the speaker, instead of merely gaining the verbal information itself. For a language such as Chinese this is essential.

FIG. 10 is a block diagram showing a modification of the transmitter of FIG. 6, wherein the instantaneous pitch frequency of the original speech is monitored and transmitted along with the monotonic speech, for subsequent reconstruction. Speech signals are again applied to channels I, II and III by use of monotonic tape transports, the outputs of which result in speech having a constant pitch frequency. The monotonic speech is then subjected to the same interlaced multiplexing process described for FIG. 6. In addition, the instantaneous speed of the variable speed capstan of the monotonic tape transport 151 is monitored by the use of either a tachometer, or the output of a pitch frequency variation feedback loop used with a fundamental extractor and a synchronous motor. With a tachometer, the signal may be an amplitude signal proportional to the instantaneous frequency. In the case of the synchronous motor driving the capstan, the signal is a varying frequency proportional to the difference between the 125 cycle pitch frequency, and the actual pitch frequency.

The modulator 152 and subcarrier oscillator 153 generate a narrow band subcarrier that can be either AM or FM modulated. The subcarrier frequency *f1* can be located wherever some of the frequency spectrum is available. The modulated subcarrier is then applied to the main modulator and transmitter (or telephone lines) indicated at 154. Channel II is the same as channel II in FIG. 6 except for monitoring of pitch frequency variation as described above for channel I. The modulator 155, with the subcarrier oscillator 156 at frequency *f2*, creates a second subcarrier with pitch information for channel II. The second modulated subcarrier is applied to the main modulator and transmitter (or telephone lines) 154. Channel III is the same as channel III in FIG. 6, except for the modulation of a subcarrier by means of the pitch frequency variation information. The subcarrier oscillator 157 and modulator 158 produce the modulated subcarrier at a third frequency *f3*. This signal is also applied to the main modulator and transmitter (or telephone lines) 154.

In brief, while some of the speech energy is changed to monotonic speech in the tape transports like 151, another part of the speech energy is supplied to the fundamental extractors like 160 which extract the variable fundamental frequency, and this too is transmitted as a part of the complete signal. As here shown, for this purpose three different subcarriers are modulated by the three variable fundamental frequencies. Box 151 and those below it in FIG. 10 are the same as box 26 in FIG. 2, and include the same constant and variable speed motors to provide the desired monotonic output.

The speech part going to the fundamental extractor preferably is applied to a delay line which here is not shown separately. The delay line or network is for the purpose of compensating for the average delay in the tape transport. The delay line is assumed to be in the box 160 of the fundamental extractor. In the latter the pitch frequency is extracted from the speech. The pitch frequency is then used in modulator 152 to modulate a subcarrier generated at 153. This is transmitted on telephone lines or is used for modulation in the wireless transmitter 154. At the receiver this may be made use of as described later to reconstitute normal speech. The modulation at the subcarrier modulator 152 may be AM, FM, PM or SSB. These remarks all apply to channels II and III as well as channel I.

Another way to obtain a reconstituted signal as already mentioned, is to monitor the speed of the pickup motor (motor 21 in FIG. 2) as it is varied. If the tape transport pickup capstan (16 in FIG. 2) is turned by a synchronous motor, then the variable frequency applied to the synchronous motor is used to modulate the subcarrier, and the latter is transmitted for subsequent amplification and application to a synchronous motor at the record head of the tape transport in the receiver, as is described later. A tachometer also may be used, coupled to the capstan, and giving a voltage output proportional to the capstan speed. This voltage is used to modulate a subcarrier for transmission.

FIG. 11 shows the block diagram of a receiver designed to receive the complex signal created by the transmitter described in FIG. 10 and to demodulate, separate the interlaced multiplexed channels, and reconstitute the speech in each channel, so that it is in the form of the original speech. An interlaced multiplex signal is obtained from either the receiver IF amplifier 161 or telephone lines 162. The interlaced multiplexed signal is separated into its component channels by a unit 163, similar to what is shown in FIGS. 8 or 9. The subcarriers are demodulated using standard subcarrier demodulation techniques in boxes 164, 165 and 166.

The outputs of channels I, II and III are monotonic, and are applied to what may be called inverse tape transports 167, 168 and 169. These are described later. The demodulated subcarrier information, which is the pitch variation for each of the three channels, is applied to the inverse tape transports. The inverse tape transport output for each channel is the reconstituted sound having pitch variation.

The inverse tape transport, as applied to a single channel is shown in FIG. 12. The boxes 161, 162, 163 and 164 correspond to those similarly numbered in FIG. 11. The subcarrier is demodulated at 164 to obtain the variable fundamental, and this is utilized in means (here a variable speed tape transport) shown in box 183 to restore the monotonic speech to normal speech, which then drives a transducer or speaker 195. The inverse tape transport 183 differs from the tape transport described in FIG. 2 in that the variable and the constant speed motor are reversed, that is, the variable speed motor 191 drives the capstan 192 which drives the tape past the recording heads 184, and the constant speed motor 194 drives a capstan 185 near the pickup head 186. The tape moves in the direction shown by the arrow. The speech is amplified by amplifier 187 and applied to an audio transducer 195.

The receiver 161 also applies the incoming signal via line 188 to a subcarrier demodulator 164. The subcarrier demodulator 164 then applies the subcarrier information (which is the pitch frequency variation of the speech) to the servo drive 190. The servo drive varies the speed of the variable speed motor 191 which is mechanically coupled to the variable speed capstan 192.

The tape moves past an erasing head 200 located at any convenient point beyond the pick-up head 186, and preferably near the recording head 184. The tape moves at a variable speed past the recording head 184. The speed is determined by a capstan 192 driven by the variable speed motor 191. The latter responds to the variable fundamental frequency obtained from the subcarrier demodulator 164 and servo 190. When the variable fundamental is higher than the monotonic fundamental, the tape is slowed. Later when it is moved at constant but relatively higher speed past reproducing head 186, the output is characterized by increased frequency. Conversely, when the variable fundamental of the original speech is lower than the monotonic fundamental, the tape speed at recording head 184 is increased, so that later, when pasing head 186 at the constant but relatively lower speed, the fundamental frequency is descreased. Thus the transmitted information about the variable fundamental frequency is utlized to restore the original variations, and so to change the monotonic speech to normal speech in the amplifier 187 and transducer 195.

These relative changes in tape speed are accommodated by movement in one direction or the other of the idlers 201, linked at 202, and resiliently urged toward a rest or neutral position by centering springs 203.

This accommodation may average evenly and take place indefintely, but because the difference in some cases may be cumulative for a long time, the idlers 201 preferably are brought back to rest position at frequent intervals by releasing the variable speed drive capstan 192 in response to pauses in speech. For this purpose a part of the output of receiver 161 may be supplied to an amplifier 196, and a detector 197 which acts as a speech interval detector. Its output goes to a relay-like solenoid 198 cooperating with clutch mechanism for capstan 192, here symbolized in simple fashion by an angle lever 199 which bodily moves the capstan 192 toward or away from the tape. It will be understood that in practice the capstan is not movable, and instead may be provided with a clutch, or a small idler may be located on the opposite side of the tape and be mounted for movement toward or away from the capstan, as previously described.

The diode detector 197 should have an appropriate time constant in its output, as previously described for the speech-presence indicating circuitry in FIG. 2. As stated above, the detector output activates a solenoid type relay or clutch which engages the tape to the variable speed capstan, depending upon the presence or absence of speech. It may be necessary to incorporate a small delay, possibly a millisecond or two, in the circuit feeding the recording head 184, to compensate for the inertial delay of the clutch mechanism.

In the transmitters of FIGS. 1, 6 and 10, there may be a problem of channel interference between the components of speech above 1500 cycles when these are used, that is, if comb filters are used having a range up to 3000 cycles instead of up to 1500 cycles. The transmitters of FIGS. 6 and 10 are a great improvement over the transmitter of FIG. 1 in this respect, but even so some difficulty may arise because we deal here with the unvoiced sounds, which have no apparent harmonic structure. This problem may be additionally solved by using a combination of a comb filter for frequencies below 1500 and a passband filter for frequencies above 1500 cycles, with the passbands displaced from one another for the different channels, so that there is separation of the higher frequencies as between the different channels, but in band fashion rather than in comb fashion.

The transmitter for such a system is shown in FIG. 13, which is a modification of the transmitter shown in FIG. 10.

The speech components below 1500 cycles and above 1500 cycles are separated and again recombined to form the approximate structure shown in FIG. 14. In FIG. 14 it will be seen that the spaced frequencies of the lower 1500 cycles of each channel are interlaced, and the upper 1500 cycles of each channel are so shifted in frequency that they do not coincide. Channel I uses 1.5 to 3 kc.; channel II uses 3 to 4.5 kc.; and channel III uses 4.5 to 6 kc. It is then possible to transmit three complete speech channels which are 3 kc. wide, within the spectrum formerly occupied by two speech channels of 3 kc. bandwidth, that is, within 6 kc. of spectrum instead of 9 kc.

In FIG. 13 the special tape transports 211, 212 and 213, the delay network and fundamental extractors 241, 242, and 243, and the modulators and subcarrier oscillators 214, 215; 216, 217; and 218, 219 provide the same function as that described for FIG. 10 to obtain pitch variation information and transmit it for subsequent reconstitution of the sound at the receiver. The complete monotonic output of the special tape transport 211 in channel I is permitted to be fed directly to the main modulator 220 for modulation and radio transmission (or to telephone lines).

The monotonic speech output of tape transport 212 in channel II is applied to a low pass filter 221 having cut off at 1500 cycles, and a bandpass filter 233 with a passband of 1500 to 3000 cycles. The output of the low pass filter 221 is applied to a balanced mixer 222 along with a 100 kc. oscillator signal generated by oscillator 223. The balanced mixer output is then double-sideband suppressed-carrier, and when applied to a filter 224 having a passband of 100 kc. to 103 kc., the lower sideband is filtered out. The reinsertion oscillator 225 is applied to the product detector 226 along with the single-sideband suppressed-carrier signal. The oscillator 225 operates at 100 kc. minus 25 cycles, and the technique is the same as was described for FIG. 6. The output of the product detector 226 is applied to the main modulator and transmitter (or telephone lines) 220.

The output of the tape transport 212 is also applied to bandpass filter 233. The output of the bandpass filter is subjected to balanced mixing in mixer 227, and to filtering by a 101.5 to 103 kc. mechanical bandpass filter 228, and is applied to the product detector 229. The reinsertion oscillator 230 operates at a frequency of 98.5 kc. The upper 1500 cycle spectrum of unvoiced speech therefore is shifted by 1500 cycles. This is then applied to the transmitter 220.

Channel III is identical to channel II except that its reinsertion oscillator 232 operates at 100 kc. minus 50 cycles in order to correctly interlace or multiplex the third channel with the first and the second channels. Also, its oscillator 231 operates at 97 kc. instead of 98.5 kc. thus producing a further shift of the higher frequencies, as shown in FIG. 14. In this case the shift is 3 kc. instead of 1½ kc. The results are then applied to the transmitter 220.

The receiver to receive, detect, separate, and reconstitute the speech as transmitted by the transmitter in FIG. 13 is shown in FIG. 15. FIG. 15 is very similar to FIG. 11 except that the signal is sampled at the input to the demodulators, as shown by conductor 270 leading from block 250. This connection is ahead of the product detectors in FIG. 8 or FIG. 9. The audio signal at this point, as shown in FIG. 14, extends up to 6 kc., and with a 100 kc. local oscillator, as shown in FIGS. 8 and 9, the signal extends from 100 to 106 kc. This signal is fed to product detector 251 where it is mixed with an oscillator signal of 101.5 kc. from oscillator 252. The resultant output of the product detector is filtered at 253 to permit only the information between 1.5 and 3 kc. to pass through to the channel output. The effect is to move the unvoiced speech on channel II, which in FIG. 14 is shown as being between 3 and 4.5 kc. down to the region of 1.5 to 3 kc.

The undesirable remaining information then is filtered out, and the channel II unvoiced speech then is added to the channel II voiced information. For channel III the same procedure is used where the 4.5 to 6 kc. information is reduced to 1.5 to 3 kc. For this purpose the 100 to 106 kc. signal is mixed in the product detector 255, with the 103 kc. oscillator signal generated by oscillator 254 which operates at 103 kc. The bandpass filter 256 permits only 1.5 to 3 kc. unvoiced speech of channel III to be mixed with the voiced speech at the output of the channel III inverse tape transport 257.

It is necessary to eliminate all undesirable unvoiced speech from the signal at the inverse tape transport input. In channel I a low pass filter 258 is inserted to remove the unvoiced speech in channels II and III. It is a low pass filter with cutoff at 3 kc. In the channel II input to the inverse tape transport, the unvoiced speech information for all three channels is filtered by a low pass filter 259 operating at 1500 cycles. In like manner, the three unvoiced speech channels are again filtered for channel III by low pass filter 260.

In FIGS. 13 and 15 the system provides two added features (compared to FIG. 6) one being the reconstitution of speech by using fundamental extractors at the transmitter and inverse tape transports at the receiver, and the other being the frequency displacement of the 1.5 to 3.0 kc. band to avoid interference between channels in that region. While not illustrated by separate block diagrams, the latter feature (bodily shift of upper frequencies) may be used without the former (reconstituted speech), and with the advantages of the latter feature, which are in no way dependent upon reconstitution of speech.

To provide such a transmitter the circuitry of FIG. 13 may be used, but is simplified by eliminating the boxes 241, 214, 215; 242, 216, 217; and 243, 218, 219. It is as though the transmitter of FIG. 6 were employed, but with filters which are of the comb type below 1500 cycles, and which are of the bandpass type above 1500 cycles, all three filters being alike as in FIG. 13, but with subsequent displacement of the upper frequencies, as well as interlacing of the lower frequencies, as illustrated in FIG. 14. The arrangement has the same benefit of reducing interference between the unvoiced sounds of the different channels.

The receiver for such a transmitter may use the circuitry of FIG. 15, but simplified by omitting the subcarrier demodulators 261, 262, and 263, and the inverse tape transports 264, 265, and 257. Each of the three channels will then have a monotonic speech output, with no attempt to restore or reconstitute pitch variations.

It will be recalled that the optional use of comb filters in a transmitter was described in connection with the transmitter of FIG. 1. Such comb filters also may be used in the transmitter of FIG. 6, these being inserted following the monotonic tape transports. However the comb filters would all be alike in FIG. 6, the same as they are alike in the receivers of FIGS. 8 and 9, say with a 125 cycle fundamental, instead of differing as in FIG. 1, where the fundamental, frequencies were mentioned to be 125, 150, and 175 cycles respectively. Such comb filters in the transmitter impart a periodic structure to the upper voice spectrum, or unvoiced sounds, and so reduce interference between channels. The receivers shown in FIGS. 8 and 9 can still be used without any alteration for reception, detection, and separation of the interlaced multiplexed signal from such a transmitter.

In FIGS. 2 and 4, the microphones, antennas and loud speaker are shown. In most of the other figures, these conventional terminations at the ends of the block diagrams have been omitted, to save space, but it will be understood that in all cases, there are transducers and antennas (or telephone lines) and that conventional amplifiers may be associated with the transducers where needed.

It is believed that my improved method and apparatus for multiplex communication of speech, as well as the advantages thereof, will be apparent from the foregoing detailed description. It will also be apparent that while I have shown and described the invention in a number of preferred forms, changes may be made without departing from the scope of the invention, as sought to be defined in the following claims. In the claims, the term "monotonic speech" is applied for convenience to a monotonic speech signal the spaced frequencies of which have been somewhat shifted as an entirety or body, without changing the spacing therebetween, as described above. Also, and again for convenience, it is stated that one signal occupies frequency space unoccupied by the others, even though in the higher frequency range a few of the higher harmonics could come into some minor interference.

I claim:

1. Apparatus for multiplexing speech communication, said apparatus comprising means to supply a plurality of speech signals, means to change each speech signal to a monotonic speech signal comprising a fixed predetermined fundamental frequency and its harmonics, means to so fix the frequencies of the monotonic signals that each has a starting frequency different from the others and has higher frequencies also different from the higher frequencies of the others, so that the spaced frequencies of the speech signals are interlaced with each occupying frequency space unoccupied by the others, means to transmit the same, means to receive the same, a plurality of separate comb filters each serving to select a fundamental and its harmonics while attenuating frequencies between said harmonics, and a plurality of transducers each driven by one of the resulting speech signals.

2. Apparatus for multiplexing speech communication, said apparatus comprising means to supply a plurality of speech signals, means to change each speech signal to a monotonic speech signal comprising a fixed predetermined fundamental frequency and its harmonics, means to so fix the frequencies of the monotonic signals that each has a starting frequency different from the others and has higher frequencies also different from the higher frequencies of the others, so that the spaced frequencies of the speech signals are interlaced with each occupying frequency space unoccupied by the others, a source of a high frequency carrier, means to modulate the carrier by the monotonic speech signals, a transmitter for transmitting the modulated carrier, a receiver for receiving the modulated carrier, means to demodulate the same and to restore the original frequency relationship, a plurality of separate comb filters each serving to select a fundamental and its harmonics while attenuating frequencies between said harmonics, and a plurality of transducers each driven by one of the resulting speech signals.

3. Apparatus for multiplex speech transmission, said apparatus comprising means to supply a plurality of speech signals, means to change each speech signal to a monotonic speech signal comprising a fixed predetermined fundamental frequency and its harmonics, means to so fix the frequencies of the monotonic signals that each has a starting frequency different from the others and has higher frequencies also different from the higher frequencies of the others, so that the spaced frequencies of the speech signals are interlaced with each occupying frequency space unoccupied by the others, a source of a high frequency carrier, means to modulate the carrier by the monotonic speech signals, and a transmitter for transmitting the modulated carrier.

4. Apparatus for multiplexing speech communication, said apparatus comprising means to supply a plurality of speech signals, means to change each speech signal to monotonic speech comprising a fixed predetermined fundamental and its harmonics, means to shift somewhat the spaced frequencies of a second channel as an entirety, means to shift by a different amount the spaced frequencies of a third channel as an entirety, and so on, so that the spaced frequencies of the speech signals are interlaced with each occupying frequency space unoccupied by the others, means to transmit the same, means to receive the same, a comb filter to select the original fundamental and its harmonics while attenuating frequencies between said harmonics, means to shift the spaced frequencies of the received signal to restore the second monotonic signal, a comb filter to select the fundamental and its harmonics from the shifted signal, means to shift the spaced frequencies of the received signal to restore the third monotonic signal, a comb filter to select the fundamental and its harmonics from the third signal, and so on, and a plurality of transducers each driven by one of the resulting speech signals.

5. Apparatus for multiplexing speech communication, said apparatus comprising means to supply a plurality of speech signals, means to change each speech signal to monotonic speech comprising a fixed predetermined fundamental and its harmonics, means to shift somewhat the spaced frequencies of a second channel as an entirety, means to shift by a different amount the spaced frequencies of a third channel as an entirety, and so on, so that the spaced frequencies of the speech signals are interlaced with each occupying frequency space unoccupied by the others, a source of a high frequency carrier, means to modulate the carrier by means of the interlaced monotonic speech signals, a transmitter for transmitting the modulated carrier, a receiver for receiving the modulated carrier, means to demodulate the same, a comb filter to select the original fundamental and its harmonics while attenuating frequencies between said harmonics, means to shift the spaced frequencies of the demodulated signal to restore the second monotonic signal, a comb filter to select the fundamental and its harmonics from the shifted signal, means to shift the spaced frequencies of the demodulated signal to restore the third monotonic signal, a comb filter to select the fundamental and its harmonics from the third signal, and so on, and a plurality of transducers each driven by one of the resulting speech signals.

6. Apparatus for multiplexing speech transmission, said apparatus comprising means to supply a plurality of speech signals, means to change each speech signal to monotonic speech comprising a fixed predetermined fundamental and its harmonics, means to shift somewhat the spaced frequencies of a second channel as an entirety, means to shift by a different amount the spaced frequencies of a third channel as an entirety, and so on, so that the spaced frequencies of the speech signals are interlaced with each occupying frequency space unoccupied by the others, a source of a high frequency carrier, means to modulate the carrier by means of the interlaced monotonic speech signals, and a transmitter for transmitting the modulated carrier.

7. Apparatus for multiplex speech reception, when receiving a carrier modulated by a plurality of different monotonic speech signals each comprising a fixed predetermined fundamental and its harmonics, the spaced frequencies of a second channel being shifted somewhat as an entirety, the spaced frequencies of a third channel being shifted as an entirety by a different amount, and so on, so that the spaced frequencies of the speech signals are interlaced with each occupying frequency space unoccupied by the others, said apparatus comprising a receiver for receiving the modulated carrier, means to demodulate the same, a comb filter to select the original fundamental and its harmonics while attenuating frequencies between said harmonics, means to shift the spaced frequencies of the demodulated signal to restore the second monotonic signal, a comb filter to select the fundamental and its harmonics from the shifted signal, means to shift the spaced frequencies of the demodulated signal to restore the third monotonic signal, a comb filter to select the fundamental and its harmonics from the third signal, and so on, and a plurality of transducers each driven by one of the resulting speech signals.

8. Apparatus for multiplexing speech communication, said apparatus comprising means to supply a plurality of speech signals, means to change each speech signal to monotonic speech comprising a fixed predetermined fundamental frequency and its harmonics, means to so fix the frequencies of the monotonic signals that each has a starting frequency different from the others and has higher frequencies also different from the higher frequencies of the others, so that the spaced frequencies of the speech signals are interlaced with each occupying frequency space unoccupied by the others, a plurality of fundamental extractors to separately extract the variable fundamental frequency from each of the speech signals, means for transmitting the interlaced signals and variable fundamentals, means for receiving the same, means to restore the original frequency relationship of the speech signals, a plurality of separate comb filters each serving to select a fundamental and its harmonics while attenuating frequencies between said harmonics, means responsive to the first variable fundamental to restore the first monotonic speech signal to normal speech, means responsive to the second variable fundamental to restore the second monotonic speech signal to normal speech, and so one, and a plurality of transducers each driven by one of the restored speech signals.

9. Apparatus for multiplexing speech communication, said apparatus comprising means to supply a plurality of speech signals, means to change each speech signal to monotonic speech comprising a fixed predetermined fundamental frequency and its harmonics, means to so fix the frequencies of the monotonic signals that each has a starting frequency different from the others and has higher frequencies also different from the higher frequencies of the others, so that the spaced frequencies of the speech signals are interlaced with each occupying frequency space unoccupied by the others, a plurality of fundamental extractors to separately extract the variable fundamental frequency from each of the speech signals, a source of a high frequency carrier and a plurality of subcarriers, means to modulate the carrier by the monotonic speech signals, means to separately modulate the subcarriers by the respective variable fundamentals, a transmitter for transmitting the resulting modulated carrier and subcarriers, a receiver for receiving the same, means to demodulate the same to obtain the speech signals and subcarriers, means to restore the original frequency relationship of the speech signals, a plurality of separate comb filters each serving to select a fundamental and its harmonics while attenuating frequencies between said harmonics, means to separately demodulate the subcarriers to obtain the variable fundamentals, means responsive to the first variable fundamental to restore the first monotonic speech signal to normal speech, means responsive to the second variable fundamental to restore the second monotonic speech signal to normal speech, and so on, and a plurality of transducers each driven by one of the restored speech signals.

10. Apparatus for multiplexing speech transmission, said apparatus comprising means to supply a plurality of speech signals, means to change each speech signal to monotonic speech comprising a fixed predetermined fundamental frequency and its harmonics, means to so fix the frequencies of the monotonic signals that each has a starting frequency different from the others and has higher frequencies also different from the higher frequencies of the others, so that the spaced frequencies of the speech signals are interlaced with each other occupying frequency space unoccupied by the others, a plurality of fundamental extractors to separately extract the variable fundamental frequency from each of the speech signals, a source of a high frequency carrier and a plurality of subcarriers, means to modulate the carrier by the monotonic speech signals, means to separately modulate the subcarriers by the respective variable fundamentals, and a transmitter for transmitting the resulting modulated carrier and subcarriers.

11. Apparatus for multiplex speech reception, when receiving a carrier modulated by a plurality of different monotonic speech signals each comprising a fixed predetermined fundamental frequency and its harmonics, the frequencies of the monotonic signals being so fixed that each has a starting frequency different from the others and has higher frequencies also different from the higher frequencies of the others, so that the spaced frequencies of the speech signals are interlaced with each occupying frequency space unoccupied by the others, and a plurality of subcarriers separately molulated by the respective variable fundamentals of the speech signals, said apparatus comprising a receiver for receiving the carrier and subcarrier, means to demodulate the same to obtain the speech signals and subcarriers, means to restore the original frequency relationship of the speech signals, a plurality of separate comb filters each serving to select a fundamental and its harmonics while attenuating frequencies between said harmonics, means to separately demodulate the subcarriers to obtain the variable fundamentals, means responsive to the first variable fundamental to restore the first monotonic speech signal to normal speech, means responsive to the second variable fundamental to restore the second monotonic speech signal to normal speech, and so on, and a plurality of transducers each driven by one of the restored speech signals.

References Cited in the file of this patent

UNITED STATES PATENTS

| | | |
|---|---|---|
| 2,401,402 | Bedford | June 4, 1946 |
| 2,407,238 | Abraham | Sept. 10, 1946 |
| 2,817,711 | Feldman | Dec. 24, 1957 |